Aug. 22, 1933.   R. T. STULL   1,923,515
WHIRLPOOL CLEANER
Filed July 21, 1930   2 Sheets-Sheet 1
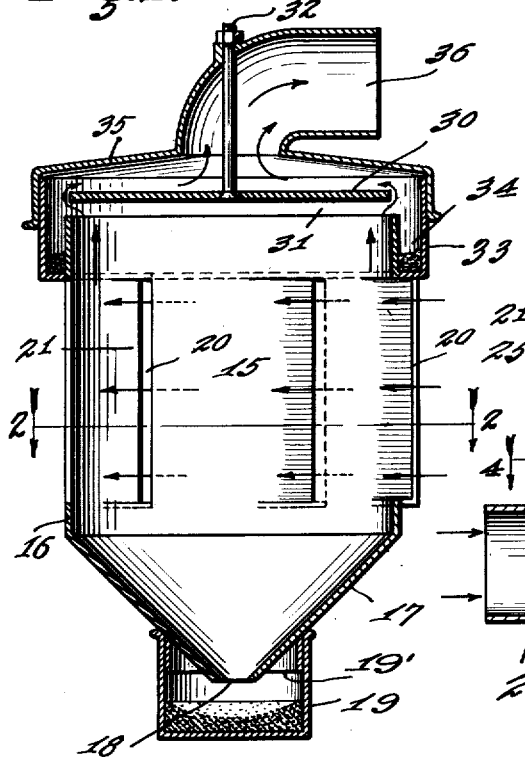
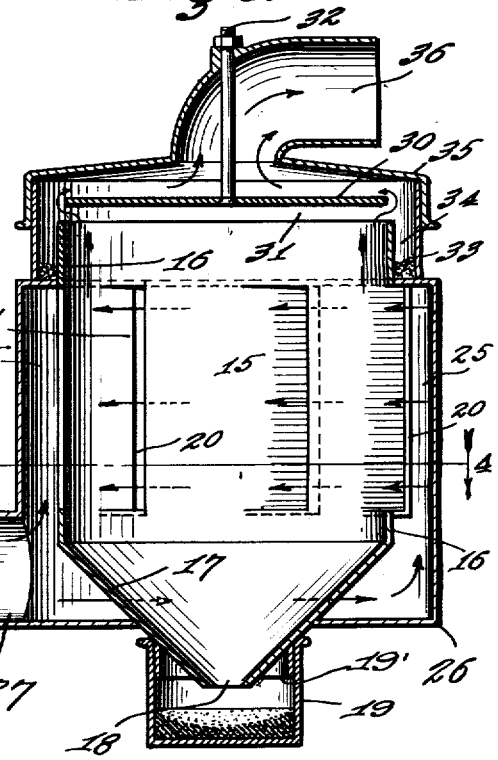
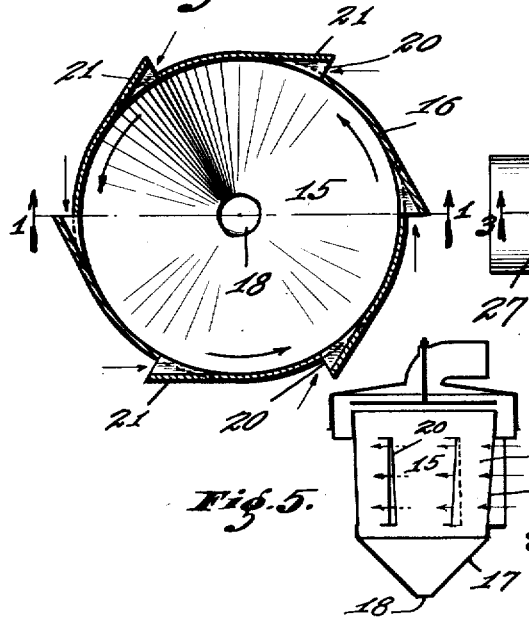
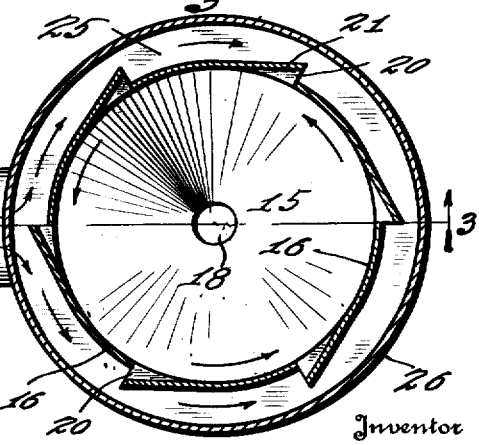
Inventor
RAY T. STULL,

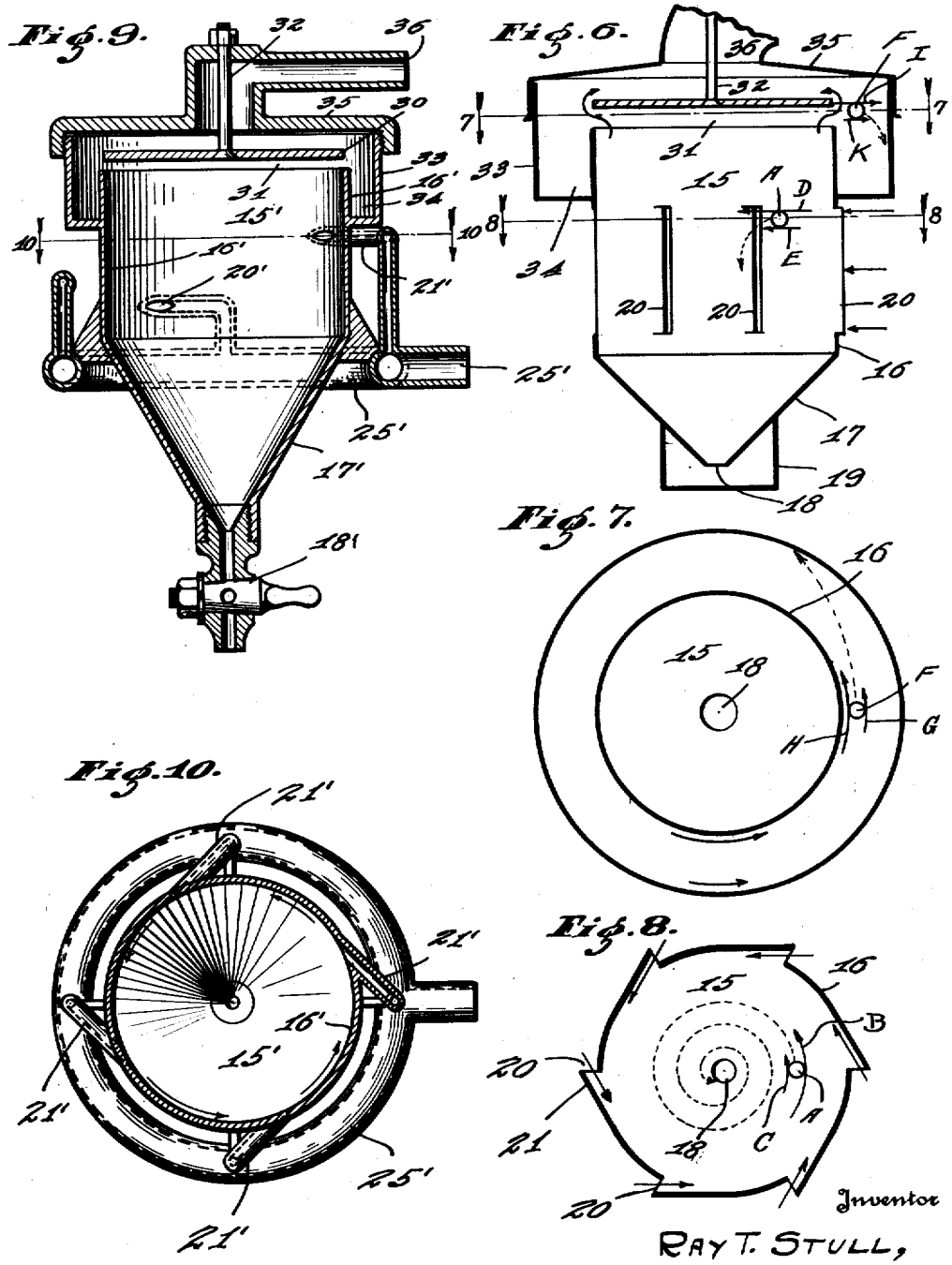

Patented Aug. 22, 1933

1,923,515

UNITED STATES PATENT OFFICE

1,923,515
WHIRLPOOL CLEANER

Ray T. Stull, Washington, D. C., assignor to Stull Process Company, Savannah, Ga., a Corporation of Georgia Application July 21, 1930. Serial No. 469,304

17 Claims. (Cl. 183—84)

It is the object of my invention to separate fluids, both gases and liquids, from solid and liquid particles which contaminate them. While my invention is capable of very broad application, a main purpose is for the cleaning of air, fuel, and oil used in internal combustion engines; thus reducing abrasion of the working parts of the engine, and thereby increasing the useful life of the engine.

It is a further object of my invention to obtain this cleaning action with a minimum resistance to the flow of the fluid being cleaned, such as the incoming air to a carbureter, and with little or no danger of clogging up the passages by the dirt or other removed material; and to obtain the cleaning action without the necessity for screens, filtering mediums, and movable parts such as valves or rotating arms, and at the same time without depending solely on centrifugal force although that is an element of which one phase of my invention makes use.

In carrying out my invention, both for cleaning air and liquids, I cause the fluid to be cleaned to enter tangentially, desirably at a plurality of angularly separated points and in some cases at a plurality of vertically separated points, into a chamber in which such fluid whirls by reason of said tangential inflow. The whirlpool action within this chamber causes a cleaning action. The bottom of the whirlpool chamber is desirably conical, to receive and to discharge at its bottom the contaminating matter which is collected within the chamber.

The fluid not only flows into the chamber tangentially, at the periphery thereof, but it also leaves the chamber at the periphery thereof. In the specific form of my invention here shown for illustrative purposes, that leaving is between the top of the chamber and a baffle which baffle is spaced slightly above the top of the chamber to provide a peripheral outlet desirably extending for the full circumference, and which baffle has its edges projecting out at least as far as the walls of the chamber. Below and around this outlet, outside of the wrirlpool chamber proper, is an annular collecting trough or launder, in which contaminating matter which succeeds in passing through the whirlpool chamber proper is collected. The cleaned fluid which is discharged flows around the projecting edges of the baffle plate—making a reverse turn—and is collected above the baffle plate, in a space from which another passage opens centrally and upwardly.

The accompanying drawings illustrate my invention: Fig. 1 is a vertical central section through an air cleaner embodying my invention, taken on the line 1—1 of Fig. 2; Fig. 2 is a transverse section substantially on the line 2—2 of Fig. 1; Fig. 3 is a vertical central section through a gas cleaner somewhat similar to that shown in Fig. 1, but with a gas-supply passage so that the gas being treated is not air taken indiscriminately from the atmosphere, the section being taken on the line 3—3 of Fig. 4; Fig. 4 is a transverse section on the line 4—4 of Fig. 3; Fig. 5 is a diagrammatic view showing a construction somewhat similar to that of Fig 1, on a somewhat smaller scale, with certain modified contours of the whirlpool chamber and of the intake slots; Fig. 6 is a diagrammatic view, in assumed vertical section corresponding to Fig. 1 to illustrate how the forces tend to move a contaminating particle downward both in the whirlpool chamber and in the annular launder surrounding its upper end; Fig. 7 is a diagrammatic horizontal section on the line 7—7 of Fig. 6, to illustrate how the forces tend to move a particle outward in the aforesaid launder; Fig. 8 is a diagrammatic horizontal section on the line 8—8 of Fig. 6, to illustrate how the forces tend to move a particle inward in the aforesaid whirlpool chamber; Fig. 9 is a central vertical section through a liquid cleaner embodying my invention; and Fig. 10 is a horizontal section substantially on the line 10—10 of Fig. 9.

I will describe first the cleaner for gases shown in the illustrative constructions of Figs. 1 to 8 inclusive, and then the liquid cleaner illustrated in Figs. 9 and 10.

In the constructions of Figs. 1 to 8 inclusive, a whirlpool chamber 15 of generally circular form is provided by a circular wall 16, which may be cylindrical as shown in Figs. 1 and 3 or slightly conical with the narrow end downward as shown in Fig. 5, with the axis substantially vertical. This whirlpool chamber is provided with a conical bottom 17, having its apex downward and open to provide a central discharge opening 18, which discharges downward, desirably into a removable dirt-collecting cup 19. As shown, the cup 19 is held in place by a friction grip on a downwardly projecting flange 19' of the conical bottom 17.

At a plurality of spaced points around the periphery of this whirlpool chamber there are tangential inflow openings 20, shown as provided by lips 21 which are pressed outward from the wall 16. There may be any number of these inflow openings 20. Upon the creation of a differential pressure between the inside and outside of the whirlpool chamber, with the higher pressure outside, there is a flow from the outside inward through the tangential openings 20 into the whirlpool chamber 15. This tangential inflow produces a whirling in the direction of the arrows, or counter-clockwise as seen in Figs. 2, 4, and 8.

The inflow openings 20 may be of uniform width, as is illustrated in Figs. 1, 3, and 6; or they may be tapered, desirably so that they are narrower at their upper ends than they are at their lower ends, as is illustrated in Fig. 5.

The differential pressure above referred to may be obtained either by suction within the whirlpool chamber 15, or by pressure outside of it.

Thus the inflow openings 20 may receive their gas direct from the atmosphere, as is illustrated in Figs. 1 and 2, in which case there need be no chamber surrounding the main body of the whirlpoopl chamber proper, and the outer ends of the inflow openings 20 may open directly to the atmosphere.

On the other hand, especially if the gas to be cleaned is other than air but also if the air to be cleaned is derived from some specific supply source, the whirlpool chamber 15 may be surrounded by a supply chamber 25, annular in form, formed between the walls 16 of the whirlpool chamber and an outer wall 26 surrounding it, as is shown in Figs. 3 and 4. This outer chamber 25 may be supplied from any desired source with the air or other gas to be cleaned, as through an inlet opening 27. This inlet opening 27 is shown as entering the annular chamber 25 radially, at or near the bottom thereof; in which case the gas entering thereby may flow partly in one direction and partly in the other direction around such annular chamber, as is indicated by the arrows shown in such chamber in Fig. 4. However, this radial direction of entry for the inlet 27 is merely illustrative, and any other suitable direction of entry may be used.

An adjustible baffle plate 30, shown as flat, is located slightly above the upper end of the whirlpool chamber 15, to provide a peripheral escape opening for the fluid at the top of the whirlpool chamber, desirably for the entire circumference. This baffle plate 30 may be adjustably mounted. as on a threaded supporting rod 32.

Surrounding the upper end of the whirlpool chamber and the baffle plate 30, but radially spaced therefrom, is a circular wall 33, to form between it and the upper end of the wall 16 a circular trough or launder 34; into which contaminating material is dropped by the fluid leaving the whirlpool chamber. A cover 35 is mounted on the wall 33, and is spaced upward from the baffle plate 30; and this cover is provided with a central upward outflow pipe 36 for carrying the cleaned gases to the desired place.

When a difference in pressure is created between the outflow pipe 36 and the space surrounding the wall 16 of the whirlpool chamber, with the lesser pressure at such outflow pipe, there is of course a movement of the gas from the point of higher to the point of lower pressure. This differential pressure may be by suction applied to the outflow pipe 36 in either the form shown in Figs. 1 and 2 or the form shown in Figs. 3 and 4, and is particularly applicable in the arrangement shown in Figs. 1 and 2 where the space around the walls 16 of the whirlpool chamber is simply the atmosphere. In the arrangements shown in Figs. 3 and 4 the differential pressure may equally well be produced by pressure applied to the inlet opening 27 which supplies the chamber 25; which is particularly applicable when the gas to be cleaned is under pressure and is derived from some specific source other than indiscriminately from the atmosphere.

By reason of this differential pressure, the gas to be cleaned enters the whirlpool chamber by way of the tangential inflow openings 20. This tangential inflow produces a whirling of the gas within the whirlpool chamber. As a result, contaminating particles are brought toward the vertical axis around which the rotation takes place, and in addition are caused to descend, and are dropped on to the conical bottom 17 and discharged downward through the opening 18 into the collecting cup 19. The gas being cleaned rises in the whirlpool chamber, in addition to whirling therein, and leaves such chamber at the top thereof by way of the peripheral outlet opening 31 formed just below the baffle plate 30. The air or other gas thus leaving the whirlpool chamber does so at least with a radial component, and also with a tangential component; and after leaving the whirpool chamber is compelled to suddenly turn inward around the projecting edge of the baffle plate 30 and beneath the cap 35 to reach the outflow pipe 36. As a result, the contaminating particles which have not been removed from the gas in the whirlpool chamber 15 are dropped from such gas into the trough or launder 34.

In this way, there is a double action in removing contaminating particles from the gas being cleaned, one in the whirlpool chamber 15 and one at the launder 34; and as a result the gas which is discharged through the outflow pipe 36 is substantially clean even though there was much contamination in it when it entered the whirlpool chamber.

The contaminating particles thus removed may be either solid particles or liquid particles, or both. Thus, for instance, if the cleaner is below the hood of an automobile engine, the contaminating particles may be dust particles, or droplets of oil or water, or both. The presence of some oil or water rather assists the cleaning action, probably by matting down the solid particles which are deposited even if by no other action, but also probably in part by causing such particles to aggregate into larger particles on which the forces producing the cleaning action are more effective.

I do not undertake to explain fully the theory of operation. There is for some cause a centipetal force which acts on the particles in the air or gas being cleaned, tending to carry them toward the center within the whirlpool chamber, and also a force which acts on those particles tending to carry them downward in that chamber; and there is also in the space around the outer edge of the baffle 30 a force tending to carry particles outward and a force tending to carry them downward, as well as their own momentum which tends to cause them to leave the stream of outflowing gas as it turns back upon itself around the projecting edge of the baffle plate. These forces are particularly effective on the larger particles.

Perhaps these various forces are explainable by the diagrams of Figs. 6, 7, and 8. As the stream of gas enters the whirlpool chamber 15 by the tangential inflow openings 20, and there rotates within such whirlpool chamber, there are apparently successive rings or circumferential strata of rotating gas from the circumference to the center, which rings toward the center rotate with a smaller angular velocity than do the rings toward the circumference, as is indicated by the lengths of the arrows B and C in Fig. 8. In the same way, there are apparently successive layers of rotating gas within the whirlpool chamber 15, one above the other, with the upper layers rotating more rapidly than do the lower layers, as indicated by the lengths of the arrows D and E in Fig. 6. The different speeds indicated by the arrows B and C are probably due to the acceleration which is produced by the tangential inflow of gas through the inflow openings 20, and which is more effective at the circumference than toward the center; and the different speeds indicated by the arrows D and E are probably due to the added acceleration of rotation produced at the higher levels by the accumulative action of the inflowing gases as they act on the gas which is already rotating to some extent by inflow at the lower levels.

Under these conditions, consider a contaminating particle A, solid or liquid, viewed from the top as in Fig. 8. At its point nearest the circumference of the whirlpool chamber, this particle A is in contact with a more rapidly rotating ring of gas, indicated by the arrow B, while at a point nearest the center of the whirlpool chamber it is in contact with a less rapidly rotating ring of gas, as indicated by the arrow C. This differential speed of rotation causes the particle A to roll upon itself, which rolling results in a movement of such particle toward the center as indicated with the dotted line in Fig. 8.

In substanially the same way, if viewed from the side, the particle A is in contact at its uppermost point with a more rapidly rotating layer of gas, indicated by the arrow D, than it is at its lowermost point, as indicated by the arrow E, to cause differential speeds which similarly cause the particle to roll upon itself about a horizontal axis; and this latter rolling movement causes the particle to travel downward. As a result, the particle A within the whirlpool chamber travels toward the center and downward. As I visualize it, this action is not at all a centrifugal separation due to differences in density, but instead is an action which is caused by the turning of a particle on itself due to contact on opposite sides with gas moving at different speeds; so that the cleaning action is most effective on the larger particles.

A generically somewhat similar action probably takes place in the space around the edge of the baffle 30. As the gas emerges through the peripheral outlet slot 31, it is in a state of comparatively rapid rotation. The rings of fluid near the edge of the baffle are rotating at a higher range of velocity than those near the wall 33 and the bottom of the collecting launder 34. This is due to the impetus of the emerging gas as it leaves the whirlpool chamber, and to the retarding resistance of friction offered by the walls and bottom of the launder. If any contaminating particles of liquid or solid are not removed from the gas within the whirlpool chamber, they leave with the emerging gas through the opening 31. Let F represent such a particle in Figs. 6 and 7. There are different speeds of rotation of the gases in contact with its outer and inner sides, as shown by the arrows G and H in Fig. 7, with a greater speed at its inner side as indicated by the arrow H. The differential of these speeds tends to turn the particle F on itself, to make it travel outward as indicated by the dotted line in Fig. 7. In the same way, the particle is in contact at its upper and lower surfaces with layers of gas moving at different velocities, as indicated by the arrows I and K in Fig. 6, (though indicated rather imperfectly because those arrows do not point in the true direction of movement at the point where it was deemed desirable to show the particle F in that figure to indicate that it was outside of the whirlpool chamber,) the arrow I being longer than the arrow K to indicate the larger velocity at the top of the particle; and the differential of these produces a whirling of the particle F which produces a tendency to downward movement. The downward and outward force on the particle F is increased here by gravity. It is also increased by the centrifugal force of rotation and the momentum of the particles as the flow-direction of the fluid suddenly is changed at the edge of the baffle plate from outward to inward if the particles are of greater density than the gas which carries them, as is usually the case. As a result of these forces, there is a collection in the launder 34 of contaminating particles of solid and liquid matter which have not been removed within the whirlpool chamber 15.

I do not give the foregoing theory as completely explaining the cleaning action which takes place; for it may not be the explanation, although I think it is. Whether or not this explanation is correct, the action of removing solid and liquid particles from gas occurs both within the whirlpool chamber 15 and in the launder 34, as shown by the matter collected in such launder and in the cup 19, and as shown by the substantial cleanness of the gas discharged from the outflow pipe 36.

A very similar action is obtainable for cleaning liquids, both of particles of solid matter suspended therein and of particles of liquid matter which are suspended therein but not mixed therewith or dissolved therein; such as in cleaning oil or gasoline of intermixed particles of dirt or of water. My liquid cleaner is shown in Figs. 9 and 10. Here there is a whirlpool chamber 15' formed by a circular wall 16' and having a conical bottom 17' with its apex downward, the apex having a downward outlet opening, desirably through a valve 18', by which collected liquid or solid contaminating matter may be drawn off as desired.

At a plurality of spaced points around the periphery of the whirlpool chamber, and desirably at different levels, are a plurality of inflow openings 20', provided by pipes 21' which discharge substantially tangentially into such whirlpool chamber. These pipes 21' receive their supply of liquid from a supply pipe 25', supplied in any desired way with the liquid to be cleaned.

At and around the upper end of the whirlpool chamber are provided a baffle 30, a peripheral outlet opening 31, an adjustable supporting stem 32 for the baffle plate, an outer surrounding wall 33, a launder 34, a cap 35, and an outflow pipe 36, substantially like those already described in connection with the gas cleaner of Figs. 1 to 8 inclusive.

Upon the creation of a differential pressure between the supply pipe 25' and the outflow pipe 36, either by pressure on the former or suction on the latter, a flow of liquid is produced from such supply pipe, through the pipes 21' and inflow openings 20', into the whirlpool chamber 15', where whirling takes place just as in the case of the gas cleaner. The whirling liquid whirls in such whirlpool chamber, and rises therein, with greater velocity toward the outside than toward the inside and toward the top than toward the bottom. Whether as a result of this differential speed of rotation between different rings and different layers or otherwise, and the resultant rolling on themselves of contaminating discrete particles of liquid or solid matter, there is a depositing of such contaminating particles in the cone 17', from which such contaminating matter may be drawn off through the valve 18'.

In addition, as the rotating liquid passes out of the whirlpool chamber through the peripheral outlet opening 31, and around the edge of the baffle plate 30, there is a depositing of contaminated liquid and solid matter in the launder 34.

As a result of these depositings of contaminating matter, the liquid which flows out from the outflow pipe 36 is substantially clean from any contaminating liquid and solid particles, save those which are so small that they are substantially colloidal.

I claim as my invention:

1. A cleaner for fluids, comprising walls forming a vertical-axis substantially unobstructed whirlpool chamber having tangential inflow openings at spaced points around its circumference and a circumferential outflow opening, flow-directing means at said outflow opening for causing the fluid to make a reverse turn as it leaves said chamber, and means associated with said flow-directing means for collecting contaminating matter.

2. A cleaner for fluids, comprising a vertical-axis whirlpool chamber having a plurality of tangential inflow openings at spaced points around its circumference and an outflow opening, and flow-directing means for causing outflowing fluid to make a reverse turn, said inflow openings being arranged to enter said whirlpool chamber over a considerable height.

3. A cleaner for fluids, comprising a vertical-axis whirlpool chamber, means for supplying fluid to be cleaned into said chamber to produce greater angular velocities of fluid rotation at higher levels than at lower levels and at points nearer the circumference than at points nearer the axis, and an outflow passage at the circumference of said chamber arranged to cause outflowing fluid to make a reverse turn as it leaves said whirlpool chamber.

4. A cleaner for fluids, comprising a vertical-axis whirlpool chamber, means for supplying fluid to be cleaned into said chamber to produce greater angular velocities of fluid rotation at higher levels than at lower levels and at points nearer the circumference than at points nearer the axis, and a circumferentially opening outflow passage for said chamber arranged to cause outflowing fluid to make a reverse turn as it leaves said whirlpool chamber.

5. A cleaner for fluids, comprising a vertical-axis substantially unobstructed whirlpool chamber having a tangential inflow opening and a higher outflow opening disposed circumferentially of said chamber and having an associated projecting edge, and means for causing outflowing fluid to flow around said projecting edge.

6. A cleaner for fluids, comprising walls forming a vertical-axis substantially unobstructed whirlpool chamber having a tangential inflow opening and a higher outflow opening disposed circumferentially of said chamber, and flow-directing means at said outflow opening for causing the fluid to make a reverse turn as it leaves said chamber.

7. A cleaner for fluids, comprising walls forming a vertical-axis substantially unobstructed whirlpool chamber having a tangential inflow opening and a higher outflow opening disposed circumferentially of said chamber, flow-directing means at said outflow opening for causing the fluid to make a reverse turn as it leaves said chamber, a conical bottom for said chamber with apex downward, and an outlet for contaminating matter at said apex.

8. A cleaner for fluids, comprising a vertical-axis whirlpool chamber having a plurality of tangential inflow openings at spaced points around its circumference and a higher outflow opening, and flow-directing means for causing outflowing fluid to make a reverse turn, said tangential inflow openings being slots of considerable height so that they produce a cumulative acceleration of the fluid toward the top of the whirlpool chamber.

9. A cleaner for fluids, comprising a vertical-axis whirlpool chamber into which fluid is supplied and caused to rotate, said whirlpool chamber having a circumferential outlet, and an enclosing chamber into which said outlet discharges fluid from the whirlpool chamber; said enclosing chamber being arranged to cause outflowing fluid to make a reverse turn as it flows to a higher fluid discharge opening, and having a collecting trough to receive contaminating matter dropped by said fluid at said turn.

10. A cleaner for fluids, comprising a substantially circular whirlpool chamber having its axis upright, tangential inflow openings at spaced points around the circumference of said chamber, a baffle plate adjacent the top of said chamber, a circumferential outflow opening below said baffle plate, an enclosure around and spaced from said baffle plate and having a discharge opening higher than said circumferential outflow opening, said enclosure arranged to receive outflowing fluid from said chamber outflow opening and to direct the flow of said fluid around the edge of said baffle plate to said discharge opening.

11. A cleaner for fluids as set forth in claim 10 with the addition that the baffle plate enclosure forms a trough outside and below said chamber outflow opening for collecting contaminating matter which settles therein.

12. A cleaner for fluids, comprising a substantially circular whirlpool chamber having its axis upright, a tangential inflow opening extending along a considerable portion of the height of said whirlpool chamber, a baffle plate adjacent the top of said chamber, a circumferential outflow opening below said baffle plate, an enclosure around and spaced from said baffle plate and having a discharge opening higher than said circumferential outflow opening, said enclosure arranged to receive outflowing fluid from said chamber-outflow-opening and to direct the flow of said fluid around the edge of said baffle plate to said discharge opening.

13. A cleaner for fluids, comprising two chambers, one of which has its upper end within and surrounded by the other, said first chamber having a tangential inflow opening and a higher circumferential outflow opening, which latter discharges into said second chamber, and said second chamber having a portion below said circumferential outflow opening and also having an opening at a higher point.

14. A cleaner for fluids, comprising two chambers, one of which has its upper end within and surrounded by the other, said first chamber having a plurality of tangential inflow openings at spaced points around the circumference and a higher circumferential outflow opening, which latter discharges into said second chamber, and said second chamber having a portion below said circumferential outflow opening and also having an opening at a higher point.

15. A cleaner for fluids, comprising two chambers, one of which has its upper end within and supported by the other, said first chamber having a tangential inflow opening extending a considerable portion of the height of said whirlpool chamber and a higher circumferential outflow opening, which latter discharges into said second chamber, and said second chamber having a portion below said circumferential outflow opening and also having an opening at a higher point.

16. A cleaner for fluids, comprising two chambers, one of which has its upper end within and surrounded by the other, said first chamber having a plurality of tangential inflow openings at spaced points around the circumference and admitting fluid to be cleaned over a considerable portion of the height of said whirlpool chamber and a higher circumferential outflow opening, which latter discharges into said second chamber, and said second chamber having a portion below said circumferential outflow opening and also having an opening at a higher point.

17. A cleaner for fluids, comprising a vertical axis substantially unobstructed whirlpool chamber, a tangential inflow opening in said chamber for producing a whirlpool action therein whereby contaminating particles are caused to accumulate near said vertical axis, an outflow opening higher than said inflow opening and spaced radially from said vertical axis, and means associated with said outflow opening for causing outflow fluid to flow around a projecting edge.

RAY T. STULL.

CERTIFICATE OF CORRECTION.

Patent No. 1,923,515.　　　　　　　　　　　　　　　August 22, 1933.

RAY T. STULL.

It is hereby certified that error appears in the printed specification of the above numbered patent requiring correction as follows: Page 4, line 107, claim 8, before "acceleration" insert the word "rotative"; page 5, line 24, claim 15, for "supported" read "surrounded"; and that the said Letters Patent should be read with these corrections therein that the same may conform to the record of the case in the Patent Office.

Signed and sealed this 26th day of September, A. D. 1933.

F. M. Hopkins (Seal)　　　　　　　　　　　　　　　　　　　Acting Commissioner of Patents.

of said fluid around the edge of said baffle plate to said discharge opening.

13. A cleaner for fluids, comprising two chambers, one of which has its upper end within and surrounded by the other, said first chamber having a tangential inflow opening and a higher circumferential outflow opening, which latter discharges into said second chamber, and said second chamber having a portion below said circumferential outflow opening and also having an opening at a higher point.

14. A cleaner for fluids, comprising two chambers, one of which has its upper end within and surrounded by the other, said first chamber having a plurality of tangential inflow openings at spaced points around the circumference and a higher circumferential outflow opening, which latter discharges into said second chamber, and said second chamber having a portion below said circumferential outflow opening and also having an opening at a higher point.

15. A cleaner for fluids, comprising two chambers, one of which has its upper end within and supported by the other, said first chamber having a tangential inflow opening extending a considerable portion of the height of said whirlpool chamber and a higher circumferential outflow opening, which latter discharges into said second chamber, and said second chamber having a portion below said circumferential outflow opening and also having an opening at a higher point.

16. A cleaner for fluids, comprising two chambers, one of which has its upper end within and surrounded by the other, said first chamber having a plurality of tangential inflow openings at spaced points around the circumference and admitting fluid to be cleaned over a considerable portion of the height of said whirlpool chamber and a higher circumferential outflow opening, which latter discharges into said second chamber, and said second chamber having a portion below said circumferential outflow opening and also having an opening at a higher point.

17. A cleaner for fluids, comprising a vertical axis substantially unobstructed whirlpool chamber, a tangential inflow opening in said chamber for producing a whirlpool action therein whereby contaminating particles are caused to accumulate near said vertical axis, an outflow opening higher than said inflow opening and spaced radially from said vertical axis, and means associated with said outflow opening for causing outflow fluid to flow around a projecting edge.

RAY T. STULL.

CERTIFICATE OF CORRECTION.

Patent No. 1,923,515.   August 22, 1933.

RAY T. STULL.

It is hereby certified that error appears in the printed specification of the above numbered patent requiring correction as follows: Page 4, line 107, claim 8, before "acceleration" insert the word "rotative"; page 5, line 24, claim 15, for "supported" read "surrounded"; and that the said Letters Patent should be read with these corrections therein that the same may conform to the record of the case in the Patent Office.

Signed and sealed this 26th day of September, A. D. 1933.

F. M. Hopkins (Seal)   Acting Commissioner of Patents.

CERTIFICATE OF CORRECTION.

Patent No. 1,923,515.  August 22, 1933.

RAY T. STULL.

It is hereby certified that error appears in the printed specification of the above numbered patent requiring correction as follows: Page 4, line 107, claim 8, before "acceleration" insert the word "rotative"; page 5, line 24, claim 15, for "supported" read "surrounded"; and that the said Letters Patent should be read with these corrections therein that the same may conform to the record of the case in the Patent Office.

Signed and sealed this 26th day of September, A. D. 1933.

F. M. Hopkins (Seal) Acting Commissioner of Patents.